US 12,350,770 B2

(12) United States Patent
Schaffitz et al.

(10) Patent No.: US 12,350,770 B2
(45) Date of Patent: Jul. 8, 2025

(54) WELDER TORCH BODY

(71) Applicant: The ESAB Group, Inc., North Bethesda, MD (US)

(72) Inventors: Matthias Schaffitz, Tuttwil (CH); Xavier Jauregui, Playa Del Rey, CA (US)

(73) Assignee: THE ESAB GROUP INC., North Bethesda, MD (US)

(*) Notice: Subject to any disclaimer, the term of this patent is extended or adjusted under 35 U.S.C. 154(b) by 0 days.

(21) Appl. No.: 18/326,580

(22) Filed: May 31, 2023

(65) Prior Publication Data

US 2023/0302565 A1  Sep. 28, 2023

Related U.S. Application Data

(63) Continuation of application No. 17/104,134, filed on Nov. 25, 2020, now Pat. No. 11,673,204.

(51) Int. Cl.
*B23K 9/29*    (2006.01)
*B23K 9/167*   (2006.01)
*B23K 9/28*    (2006.01)
*B23K 35/38*   (2006.01)

(52) U.S. Cl.
CPC .............. *B23K 9/296* (2013.01); *B23K 9/285* (2013.01); *B23K 35/383* (2013.01); *B23K 9/167* (2013.01)

(58) Field of Classification Search
CPC ........ B23K 9/296; B23K 9/285; B23K 9/167; B23K 35/383; B23K 9/32; B23K 9/0956; B23K 9/0953
See application file for complete search history.

(56) References Cited

U.S. PATENT DOCUMENTS

| 3,636,401 A | 1/1972 | Cortorillo et al. |
| 4,001,461 A | 1/1977 | Bykhovsky |
| 4,145,595 A | 3/1979 | Keller et al. |

(Continued)

FOREIGN PATENT DOCUMENTS

| CN | 201645008 A | 11/2010 |
| CN | 101920384 A | 12/2010 |

(Continued)

OTHER PUBLICATIONS

Notification of Transmittal of the International Search Report and the Written Opinion including International Search Report and the Written Opinion dated Apr. 5, 2022, 13 pages.

*Primary Examiner* — Brian W Jennison
(74) *Attorney, Agent, or Firm* — Edell, Shapiro & Finnan, LLC

(57) ABSTRACT

A torch for performing TIG welding is disclosed. In accordance with at least one embodiment of the present invention, the torch includes a torch body having a cavity configured to receive and support an electrode assembly, a first shield gas channel, and a second shield gas channel. The first shield gas channel extends from an external surface of the torch body to a first plenum that is fluidly coupled to the cavity so that the first shield gas channel is configured to direct a first shield gas into the cavity. The first plenum is defined, at least in part, by the cavity and is disposed radially exterior of a portion of the electrode assembly. The second shield gas channel is configured to direct a second shield gas to exit the torch body along a path that that is radially exterior of the cavity.

20 Claims, 11 Drawing Sheets

(56) References Cited

U.S. PATENT DOCUMENTS

| | | | |
|---|---|---|---|
| 5,097,111 A | 3/1992 | Severance, Jr. | |
| 5,399,831 A * | 3/1995 | McGee | H05H 1/3405 |
| | | | 219/121.48 |
| 5,403,987 A | 4/1995 | Rehrig | |
| 5,473,132 A | 12/1995 | Sperling | |
| 5,789,717 A | 8/1998 | Imaizumi et al. | |
| 5,965,040 A * | 10/1999 | Luo | H05H 1/34 |
| | | | 219/121.48 |
| 6,040,545 A | 3/2000 | Taki et al. | |
| 6,329,627 B1 | 12/2001 | Walters | |
| 6,686,559 B1 | 2/2004 | Walters | |
| 6,797,921 B1 | 9/2004 | Niedereder et al. | |
| 6,847,007 B2 | 1/2005 | Danzer | |
| 6,927,361 B2 | 8/2005 | Kelly et al. | |
| 7,078,646 B2 | 7/2006 | Bome et al. | |
| 7,112,759 B1 | 9/2006 | Severance, Jr. | |
| 7,181,821 B2 | 2/2007 | Anderson et al. | |
| 7,199,325 B2 | 4/2007 | Alford et al. | |
| 7,208,695 B2 | 4/2007 | Kimura et al. | |
| 7,241,971 B2 | 7/2007 | Bonnet | |
| 7,329,827 B2 | 2/2008 | Borne et al. | |
| 7,485,826 B2 | 2/2009 | Borne et al. | |
| 7,915,560 B2 | 3/2011 | Satou et al. | |
| 8,089,025 B2 | 1/2012 | Sanders | |
| 8,436,278 B2 | 5/2013 | Keller et al. | |
| 8,444,041 B2 | 5/2013 | Perry | |
| 8,662,374 B2 | 3/2014 | Laymon | |
| 8,791,383 B2 | 7/2014 | Wilhelm | |
| 8,809,723 B2 | 8/2014 | Fessl et al. | |
| 9,114,475 B2 | 8/2015 | Hollberg | |
| 9,364,915 B2 | 6/2016 | Meess et al. | |
| 9,370,839 B2 | 6/2016 | Smith et al. | |
| 9,517,523 B2 | 12/2016 | Barhorst et al. | |
| 9,536,551 B2 | 1/2017 | Tokiwa | |
| 9,566,657 B2 | 2/2017 | Knoener et al. | |
| 9,592,568 B2 | 3/2017 | O'Leary et al. | |
| 9,700,954 B2 | 7/2017 | Fisher et al. | |
| 9,700,955 B2 | 7/2017 | Fisher et al. | |
| 9,764,409 B2 | 9/2017 | Fisher et al. | |
| 9,821,402 B2 | 11/2017 | Fisher et al. | |
| 9,862,061 B2 | 1/2018 | Hughes | |
| 9,962,787 B2 | 5/2018 | Sugimoto et al. | |
| 10,058,946 B2 | 8/2018 | Smith et al. | |
| 10,092,972 B2 | 10/2018 | Meess et al. | |
| 10,166,625 B2 | 1/2019 | Hanebuth et al. | |
| 10,399,173 B2 | 9/2019 | Petolillo et al. | |
| 10,537,958 B2 | 1/2020 | Hoeger et al. | |
| 10,543,558 B2 | 1/2020 | Meess et al. | |
| 10,625,361 B2 | 4/2020 | Eminoglu et al. | |
| 2002/0038862 A1 | 4/2002 | Hildebrandt et al. | |
| 2003/0085207 A1 | 5/2003 | Hilderbrandt et al. | |
| 2004/0188390 A1 | 9/2004 | Satou et al. | |
| 2005/0236372 A1 | 10/2005 | Moe et al. | |
| 2006/0169752 A1 | 8/2006 | Den Boer et al. | |
| 2007/0045237 A1 | 3/2007 | Matz et al. | |
| 2008/0006611 A1 | 1/2008 | Borne et al. | |
| 2008/0190899 A1 | 8/2008 | Sugahara et al. | |
| 2009/0236319 A1 | 9/2009 | Matz | |
| 2010/0032414 A1 | 2/2010 | Arjakine et al. | |
| 2010/0133240 A1 | 6/2010 | Takahashi et al. | |
| 2011/0168678 A1 | 7/2011 | Takeda et al. | |
| 2012/0012560 A1 | 1/2012 | Roberts | |
| 2013/0068745 A1 | 3/2013 | Agosti et al. | |
| 2013/0105445 A1 | 5/2013 | Bertin et al. | |
| 2015/0034618 A1 | 2/2015 | Langeder et al. | |
| 2015/0151378 A1 | 6/2015 | Fujii et al. | |
| 2015/0165541 A1 | 6/2015 | Ammann | |
| 2015/0165565 A1 | 6/2015 | Miller et al. | |
| 2016/0039036 A1 | 2/2016 | Meess et al. | |
| 2016/0175780 A1 | 6/2016 | Miklos et al. | |
| 2017/0042014 A1 * | 2/2017 | Sanders | H05H 1/34 |
| 2018/0161908 A1 | 6/2018 | Smith et al. | |
| 2018/0161911 A1 | 6/2018 | Muscat-Tyler | |
| 2018/0361495 A1 | 12/2018 | Eminoglu et al. | |
| 2019/0078778 A1 | 3/2019 | Pezzo et al. | |
| 2019/0210140 A1 | 7/2019 | Parker | |
| 2020/0023468 A1 | 1/2020 | Agosti et al. | |

FOREIGN PATENT DOCUMENTS

| | | |
|---|---|---|
| DE | 10144036 C1 | 3/2003 |
| DE | 102009061013 A1 | 9/2010 |
| EP | 2008750 A1 | 12/2008 |
| WO | 2020137949 A1 | 7/2020 |

* cited by examiner

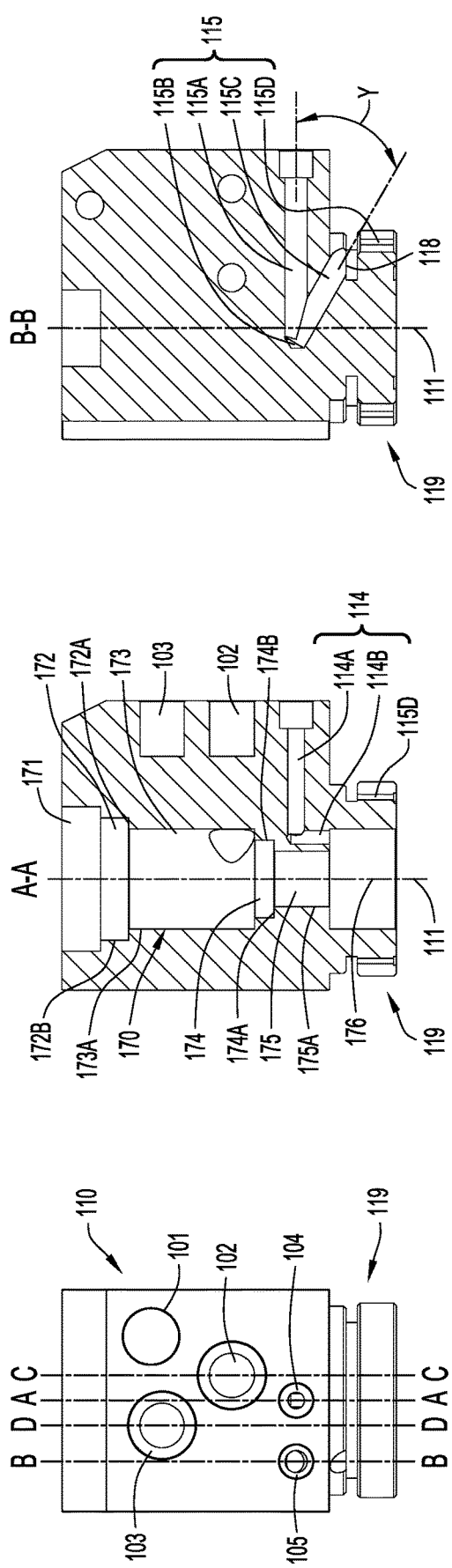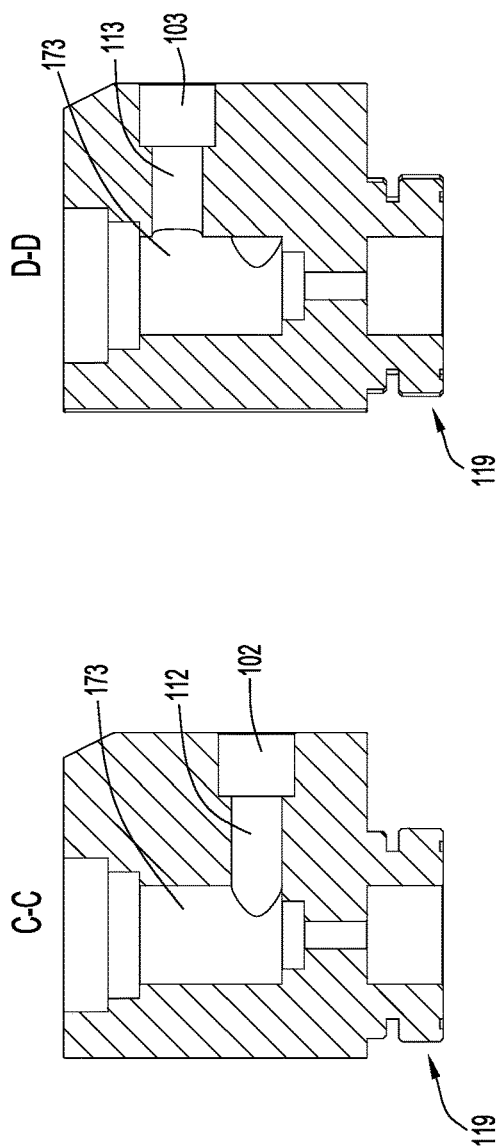
FIG.3A  FIG.3B  FIG.3C  FIG.3D  FIG.3E

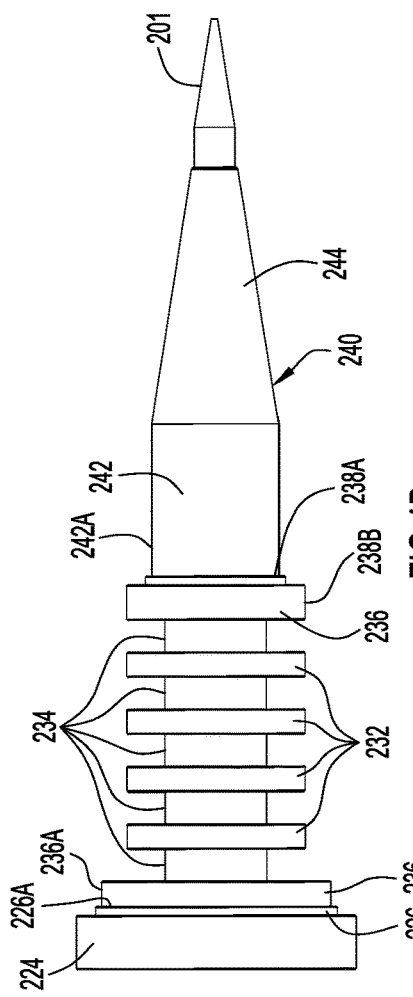
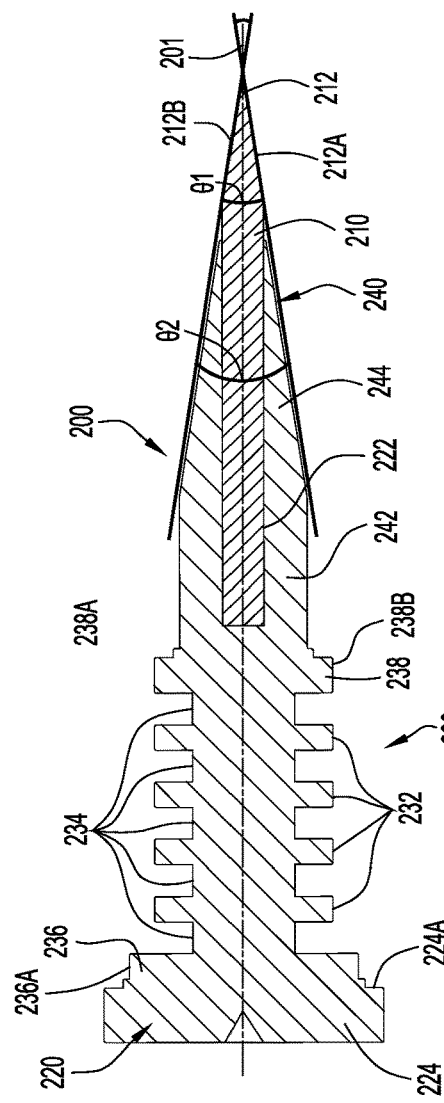
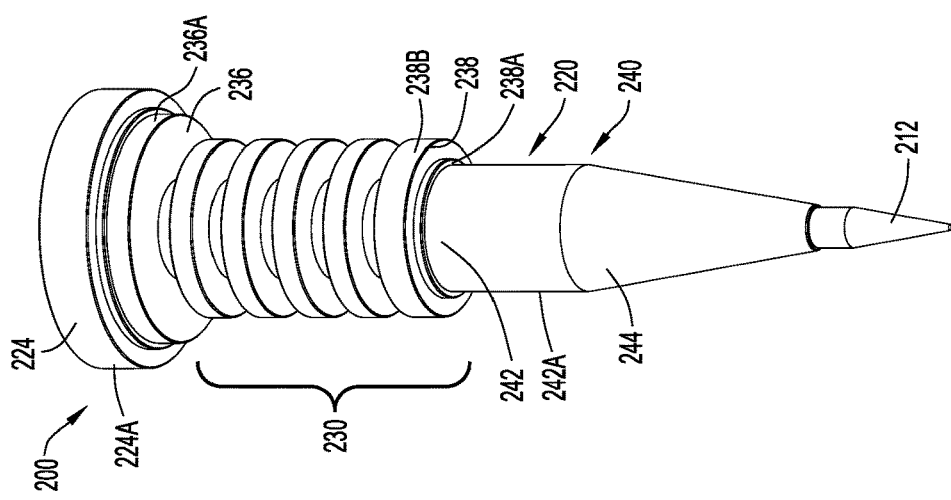
FIG.4B
FIG.4C
FIG.4A

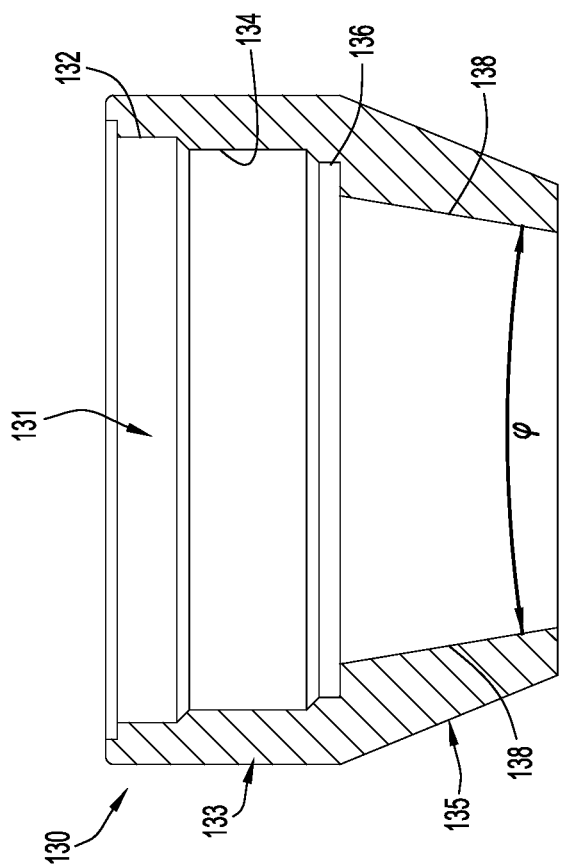
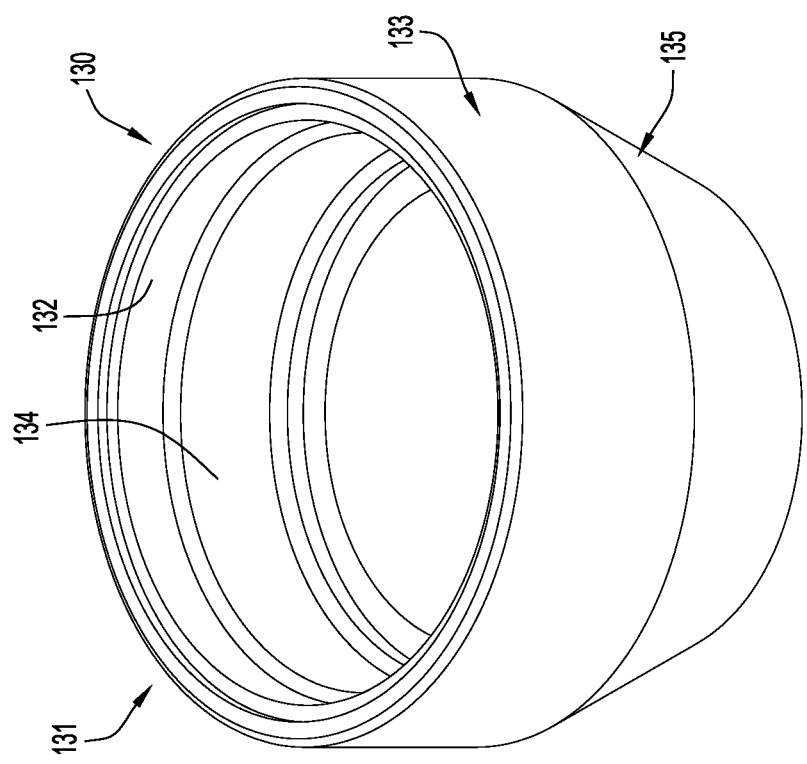
FIG.6B
FIG.6A

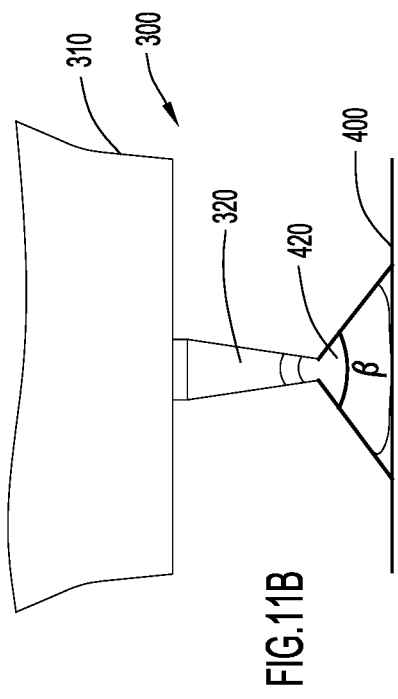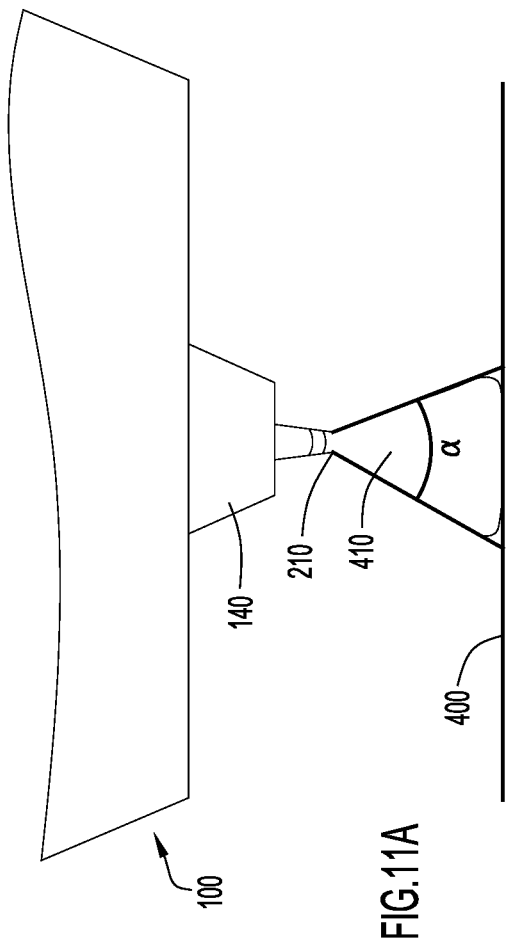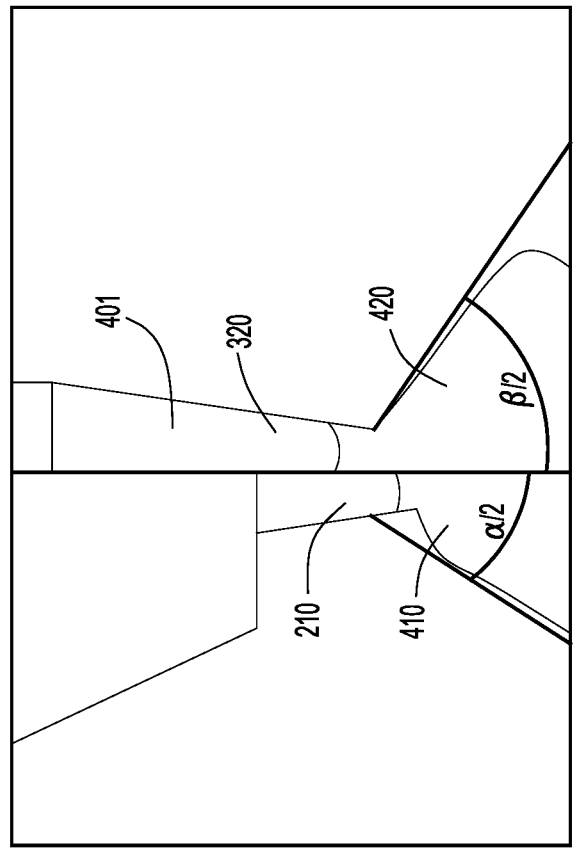
FIG.11A
FIG.11B
FIG.11C

WELDER TORCH BODY

CROSS REFERENCE TO RELATED APPLICATIONS

This application is a continuation of U.S. patent application Ser. No. 17/104,134, filed Nov. 25, 2020, the entire disclosure of which is incorporated herein by reference.

FIELD OF INVENTION

The present invention relates to the field of gas tungsten arc welding (GTAW), also known as tungsten inert gas (TIG) welding, and, in particular, a torch head for GTAW.

BACKGROUND

GTAW or TIG welding is an arc welding process that passes an electric current through a non-consumable tungsten electrode to generate an arc between the electrode and a workpiece. The electrode is made from tungsten or tungsten alloy because of its high melting temperature, e.g., about 3,422° C. (6,192° F.), which helps prevent consumption of the electrode. A filler metal may be introduced to the arc between the electrode and the workpiece, or two workpieces may be joined by melting the workpieces, via the arc, along a joint. A weld pool is created at the workpiece from the workpiece material and/or a filler metal melted by the arc. If atmospheric gases (e.g., nitrogen, oxygen, carbon dioxide, etc.) come into contact with the electrode, the arc, and/or weld pool during the welding process, this can cause fusion defects, porosity, and/or weld metal embrittlement. Accordingly, protecting the electrode, arc, and weld pool from atmospheric gases is desirable. Typically, the electrode, arc, and weld pool are protected from atmospheric gases by an inert shield gas, e.g., argon and/or helium. However, even with the inert shield gas, some contamination may occur, negatively impacting the weld and/or causing electrode to wear and/or oxidize.

TIG/GTAW welding operations generate heat in the electrode based on the arc length of a generated arc, e.g., the distance between the electrode and the workpiece. For example, the greater the arc length, the more heat generated in the electrode. Additional heat may be generated by the transmission of the current from an electrode holder, typically made of copper, to the tungsten electrode. For example, the electrode holder may be mechanically coupled to the tungsten electrode forming interstitial spaces between the holder and electrode. The interstitial spaces decrease the contact area between the holder and the electrode in which the current may pass. Thus, the current may flow around the interstitial spaces and may be funneled to the contact areas where it is transmitted to the electrode. The localized flow of current at the contact areas causes resistive heating of the electrode and holder. The width of the arc increases in response to an increase in the temperature of the electrode. That is, the hotter the electrode, the wider the arc from the electrode to the workpiece, impacting the size of the weld pool and quality of the weld. Further, if the electrode temperature is too high, the electrode may be damaged by splatter from the weld pool and/or inadvertent contact with the workpiece.

Although higher electrode temperatures may increase a depth of the weld pool, higher electrode temperatures also increase the weld pool surface area in TIG welding processes, negatively impacting at least weld precision and weld strength. In some instances, the power supplied to the electrode may be controlled to adjust the temperature of the electrode. However, adjusting the power generally does not increase the depth of the weld pool or weld penetration as much as it increases the surface area of the weld pool. Thus, such adjustments may not control temperature while achieving a strong and precise weld (e.g., a relatively narrow weld with sufficient penetration). Alternatively, weld penetration may be improved by adding an active gas to the weld area (e.g., carbon dioxide, oxygen). However, active gases generally cause conventional tungsten electrodes to wear prematurely, requiring frequent maintenance and/or replacement of the electrode.

Conventional tungsten electrodes and electrode holders typically have a long length to help dissipate and control the heat from the electrode generated by the welding process. For example, a length of conventional tungsten electrodes can range from about 75 to 610 mm (2.95 to 24.02 in). However, the length of the electrode impacts the size of the torch, and prevents the torch from being used on workpieces having a cramped weld area.

In view of at least the aforementioned issues, an improved GTAW/TIG torch and electrode that improves heat dissipation and weld penetration is desirable.

SUMMARY

The present invention relates to a torch and electrode for a TIG/GTAW welding operation. In accordance with at least one embodiment, the torch includes an electrode and an electrode holder. The electrode holder includes a proximal portion, a distal portion, and a central portion disposed between the proximal portion and the distal portion. The central portion includes a plurality of radially extending protrusions. An angle between a longitudinal axis of the assembly and an outer surface of at least one of the electrode holder and the electrode is between about five degrees and about fifteen degrees, such as about nine degrees.

In accordance with another embodiment, the torch includes a torch body having a cavity, a first shield gas channel, and a second shield gas channel. The torch further includes an electrode assembly disposed in the cavity, a nozzle concentric with the electrode, and a shield cap concentric with the nozzle. The electrode assembly includes an electrode and an electrode holder coupled to the electrode. The electrode holder includes a proximal portion, a distal portion, and a central portion disposed between the proximal portion and the distal portion. The central portion includes a plurality of radially extending protrusions.

In accordance with yet another embodiment, a method includes flowing a first gas through a first channel in a torch body, guiding the first gas to a first plenum fluidly coupled to the first channel, guiding the first gas from the first plenum through a nozzle fluidly coupled to the first plenum, the nozzle having a steep angle, generating, via the nozzle and plenum, a high-speed, laminar flow of the first gas along an outer surface of an electrode assembly concentric with the nozzle, flowing a second gas through a second channel in the torch body, guiding the second gas to a second plenum fluidly coupled to the second channel; and guiding a laminar flow of the second gas through a shield cap. The high-speed, laminar flow of the first gas prevents the second gas from contacting the electrode assembly. The steep angle of the nozzle is an angle between opposing inner surfaces of the nozzle, the steep angle is about 18 degrees.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 3A is a rear view of the torch body of the TIG/GTAW torch of FIG. 1

FIG. 3B is a cross-sectional view of the torch body taken along line A-A of FIG. 3A.

FIG. 3C is a cross-sectional view of the torch body taken along line B-B of FIG. 3A.

FIG. 3D is a cross-sectional view of the torch body taken along line C-C of FIG. 3A.

FIG. 3E is a cross-sectional view of the torch body taken along line D-D of FIG. 3A.

FIG. 4A is a perspective view of an electrode assembly according to an embodiment.

FIG. 4B is a side view of the electrode assembly of FIG. 4A.

FIG. 4C is a cross-sectional view of the electrode assembly of FIG. 4A, taken along line A-A of FIG. 4B.

FIG. 6A is a perspective view of a shield cap according to an example embodiment.

FIG. 6B is a cross-sectional view of the shield cap of FIG. 6A.

FIG. 11A is an illustration of the TIG/GTAW torch of FIG. 1 during a welding operation.

FIG. 11B is an illustration of a conventional TIG/GTAW torch during a welding operation.

FIG. 11C is an illustration comparing a cutaway of the illustration of FIG. 11A to a cutaway of the illustration of FIG. 11B.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, a TIG/GTAW torch with improved electrode temperature control (or heat dissipation) and weld penetration, as compared to conventional TIG/GTAW torches, is disclosed. The torch includes a tungsten, or tungsten alloy, electrode integrated with a copper holder. The torch further includes an inert gas flow path along the electrode, and an active gas flow path outside of and concentric with the inert gas flow path. The inert gas flow path along the electrode is set at a steep angle with respect to a longitudinal axis of the electrode. For example, the steep angle may be about 5 to 15 degrees from the longitudinal axis, such as approximately 9 degrees. During operation, the active gas decreases the surface tension of the weld pool which causes the weld pool to flow downward into the workpiece. Therefore, the weld penetration, e.g., how deep the weld pool penetrates the workpiece, increases at lower temperatures as compared to conventional TIG/GTAW welding operations.

The flow of inert gas along the electrode prevents the active gas, and/or atmospheric gases, from contacting the electrode and arc during welding. That is, the flow of inert gas acts as a curtain, preventing the flow of the active and/or atmospheric gases from reaching the arc and electrode. Thus, premature wear and/or oxidation of the electrode is prevented. The flow of inert gas is a high-speed laminar flow directed along the electrode at the steep angle. The high-speed laminar flow is generated by a back pressure generated in a plenum fluidly coupled to an inert gas channel in the torch body. The high-speed laminar flow and the steep angle generate the protective curtain of inert gas around the electrode.

The TIG/GTAW torch may be connected to a controller which controls the flow of inert gas, flow of active gas, a flow of cooling fluid, and a weld power (e.g., voltage and/or current) supplied to the torch during a welding operation. The controller may adjust the flow of inert and active gases, flow of cooling fluid, and weld power based on sensed weld parameters, e.g., weld current, weld voltage, weld penetration, etc.

Figure 1:
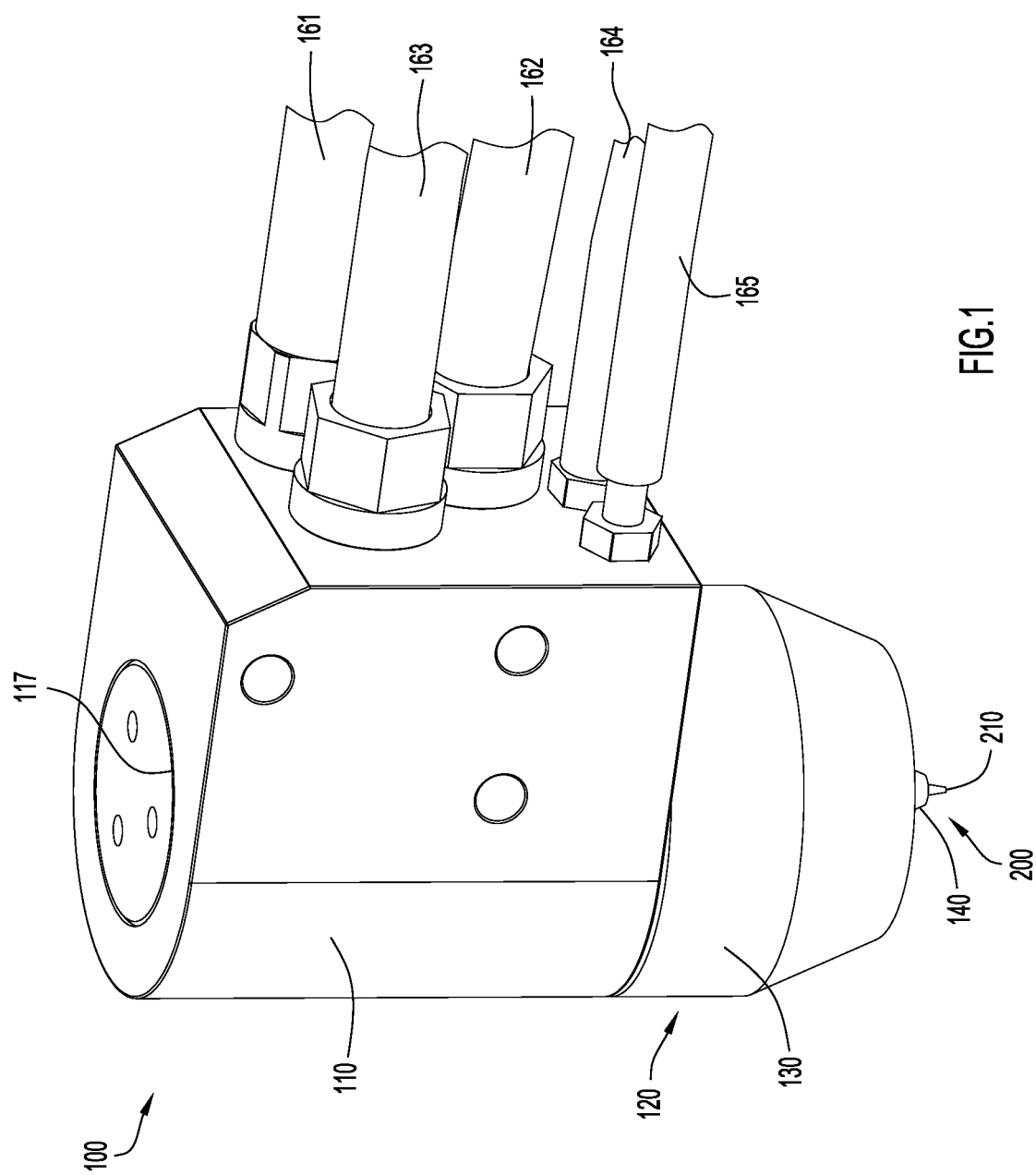
FIG. 1 is a rear perspective view of a TIG/GTAW torch, according to an example embodiment.
Figure 2:
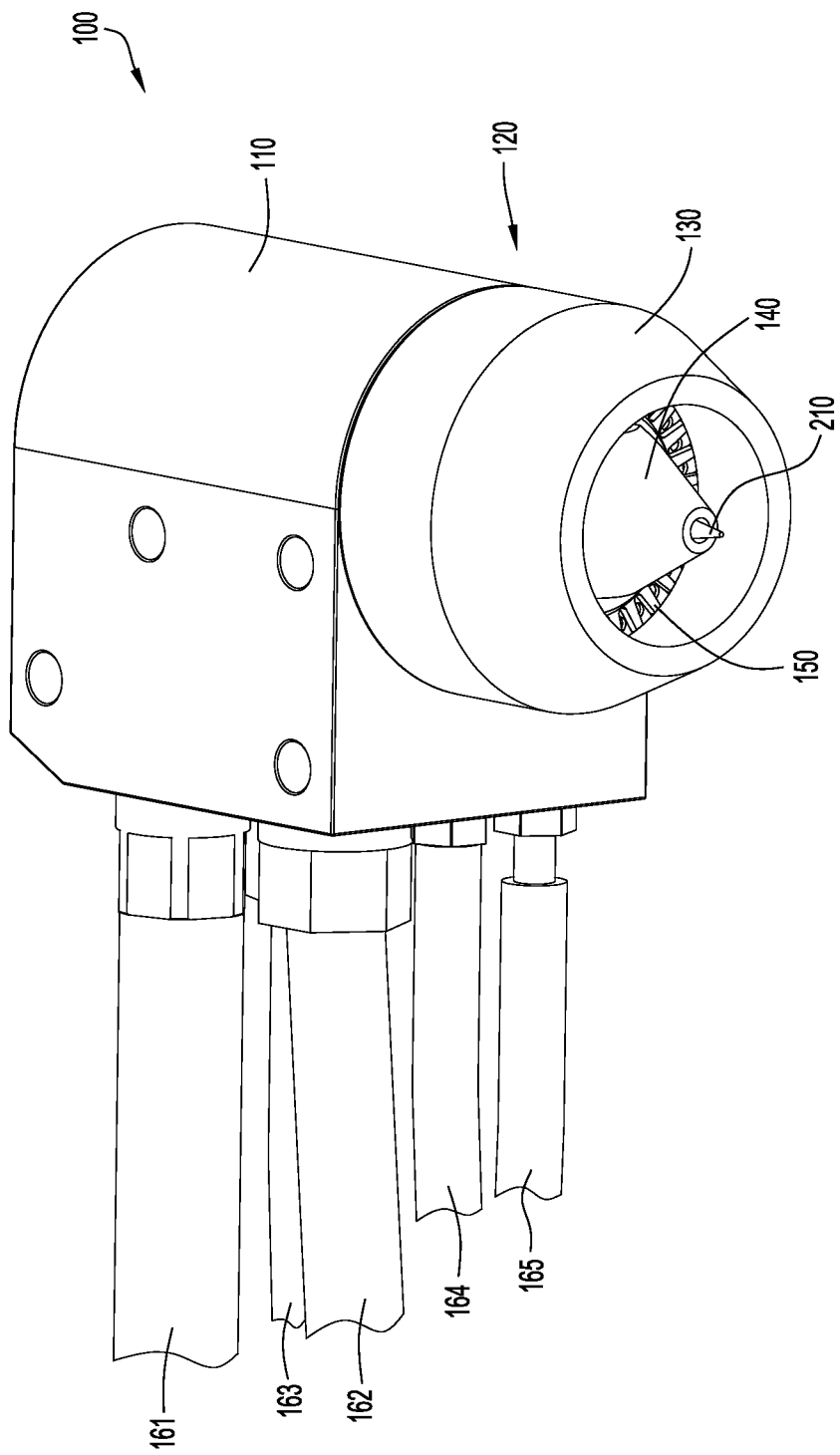
FIG. 2 is a bottom perspective view of the TIG/GTAW torch of FIG. 1.

Now referring to FIGS. 1-2, an exemplary embodiment of a torch 100 for performing gas tungsten arc welding (GTAW), also known as tungsten inert gas (TIG) welding is shown. The torch 100 includes a torch body 110 and torch head 120. The torch body 110 is configured to connect to a power supply line 161, a cooling fluid supply line 162, and cooling fluid return line 163, a first shield gas supply line 164, and a second shield gas supply line 165. The torch head 120 includes a shield cap 130, nozzle 140, and rectifier 150 disposed between the shield cap 130 and nozzle 140.

The torch body 110 and torch head 120 receive an electrode assembly 200 having an electrode 210 integrated with an electrode holder 220 (see FIGS. 4A-4C), as is discussed further below with reference to FIGS. 4A-4C. The torch body 110 is configured to transmit current from the power supply line 161 and cooling fluid from the cooling fluid supply line 162 to the electrode assembly 200 during a welding operation. The torch body 110 is further configured to supply the first and second shield gases from the first and second shield gas supply lines 164, 165 to the torch head 120.

Now referring to FIGS. 3A-3E, a rear view of the torch body 110 with cross sections taken along lines A-A, B-B, C-C, and D-D are shown. The torch body 110 includes ports 101, 103, 102, 104, and 105 for receiving the power supply line 161, the cooling fluid supply line 162, the cooling fluid return line 163, the first shield gas supply line 164 and the second shield gas supply line 165, respectively. FIG. 3B is a cross section of the torch body 110 taken along line A-A of FIG. 3A. The torch body 110 includes a cavity 170 for receiving the electrode assembly 200 and a portion of the nozzle 140. As shown, the cavity 170 extends through a length of the torch body 110 along axis 111. The cavity 170 includes six cavity portions 171-176 configured to receive the electrode assembly 200 and/or a portion of the nozzle 140. Each cavity portion 171-176 may have a diameter that is different than an adjacent portion. For example, cavity portion 171 may have the largest diameter, and may be configured to allow the electrode assembly 200 to be inserted into or removed from the torch body 110. An electrode plug 117 or cover, may be received in cavity portion 171. While the cavity 170 is shown as having six portions, embodiments are not limited thereto. The cavity 170 may be configured with any number of cavity portions for receiving the electrode assembly. For example, the cavity 170 may have more than six cavity portions, or less than six cavity portions.

Cavity portion 172 includes a first bearing surface 172A and a second bearing surface 172B, and may be configured act a seat to support the electrode assembly 200. For example, first bearing surface 172A may provide an axial support for the electrode assembly 200 in a direction parallel to axis 111. The second baring surface 172B may provide radial support to the electrode perpendicular to axis 111.

Cavity portion 173 is configured to act as a cooling chamber for the electrode assembly 200. For example, a cooling fluid may flow through the cooling chamber 173 to remove heat generated during the welding process. Cooling fluid supply channel 112 fluidly couples the cavity portion 173 with the cooling fluid supply port 102 (see FIG. 3D). Cooling fluid return channel 113 fluidly couples cavity portion 173 with the cooling fluid return port 103 (see FIG. 3E). A portion of the inner surface 173A of cavity portion 173 may provide radial support to the electrode assembly 200, perpendicular to axis 111.

Cavity portion 174 may be configured to act as a second seat to support the electrode assembly 200. For example, second bearing surface 174A may provide axial support to the electrode assembly 200 parallel to axis 111. Sidewall 174B of cavity portion 174 may provide radial support to the electrode assembly 200 perpendicular to axis 111. For example, sidewall 174B may contact an outer surface of the electrode assembly 200 to prevent radial movement of the electrode assembly 200 within the torch body 110.

Cavity portion 175 may be configured to receive a portion of the electrode assembly 200. Sidewall 175A defining cavity portion 175 may provide radial support of the electrode assembly 200, perpendicular to axis 111. For example, sidewall 175A may contact an outer surface of the electrode assembly 200 to prevent radial movement of the electrode assembly 200 within the torch body 110.

Cavity portion 176 may be configured to receive the nozzle 140. For example, an inner wall 176A defining cavity portion 176 may be threaded to receive corresponding threads 148 of the nozzle 140 (see FIG. 7A). Additionally or alternatively, the nozzle 140 may be attached to the inner wall 176A via friction fit, snap fit, and/or a cam latch.

As is shown in FIG. 3B, a first shield gas channel 114 is fluidly couples cavity portion 176 with first shield gas port 104. In the depicted embodiment, the channel 114 includes a first channel portion 114A and a second channel portion 114B substantially perpendicular to the first channel portion 114A. Specifically, the first channel portion 114A extends perpendicular to the axis 111 and the second channel portion 114B extends in a direction parallel to the axis 111. However, in other embodiments, first shield gas channel 114 may include any number of portions that extend in any direction(s).

FIG. 3C shows the second shield gas channel 115. The second shield gas channel 115 supplies the flow of second shield gas from the second shield gas port 105 to the shield cap 130. The second shield gas channel 115 includes a horizontal channel 115A extending substantially horizontally, or perpendicular to axis 111, from the second shield gas port 105 to a distal end 115B. A transverse channel 115C intersects the horizontal channel 115A extending at an angle γ from the horizontal. That is, the transverse channel 115C extends from the distal end 115B downward and towards an outer periphery of the torch body 110, creating an acute bend in the second shield gas channel 115. For example, the second shield gas channel 115 may have a "V" shape, with an angle γ of about 45 to 15 degrees. In some implementations, the angle γ may be about 30 degrees. When a flow of shield gas travels through the second shield gas channel 115, back pressure may be created in the flow of shield gas based, in part, on the configuration of the second shield channel 115. That is, the acute bend in the channel 115 assists in creating a back pressure in the flow of second shield gas. The back pressure in the flow of the second shield gas assists in creating and maintaining a laminar flow of the second shield gas through the shield cap. In the depicted embodiment, the laminar flow of the second shield gas passes exits the transverse channel 115C via an opening in the periphery of the torch body 110. Then, the shield and the torch body 110 guide the laminar flow to an interior of the shield via an axially extending channel 115D.

Referring to FIGS. 4A-C, the electrode assembly 200 is shown. The electrode assembly 200 includes an electrode 210 having a substantially cylindrical shape and electrode holder 220. The electrode 210 includes a distal end 212. In the depicted embodiment, the distal end 212 has a substantially conical shape. An angle θ1 of the cone is about 18 degrees. That is, an angle θ1 between two opposite outer surfaces 212A, 212B of the distal end 212 of the electrode 210 is about 18 degrees, +/−2 degrees. In other words, an angle between a longitudinal axis 201 of the electrode assembly 200 and an outer surface 212A, 212B of the distal end 212 is about 9 degrees, +/−1 degree. However, in other embodiments, the distal end 212 may have a frustoconical shape or a conical shape of different dimensions, such as a frustoconical shape with an angle θ1 between two opposite outer surfaces in the range of about 10-60 degrees.

The electrode holder 220 includes a proximal or contact portion 224, a central or cooling portion 230 and a distal or holding portion 240. The contact portion 224 has a cylindrical shape defined by an outer surface 224A, and is configured to receive a weld current from the power supply line 161. The contact portion 224 further includes a first bearing member 226 having a bearing surface 226A configured to rest on the bearing surface 172A of cavity portion 172 of the torch body 110 (see FIG. 3B). The outer surface 224A may be configured to contact the inner surface 172B of cavity portion 172 (see FIG. 3B).

The central or cooling portion 230 is generally cylindrically shaped and is configured to dissipate heat from the electrode holder 220 during a welding process. The cooling portion 230 includes a plurality of fins, protrusions, or ribs, 232 extending radially. The plurality of fins 232 are separated by a plurality of gaps 234. The cooling portion 230 further includes a second bearing member 236 having a radial bearing surface 236A and a third bearing member 238 having an axial bearing surface 238A and radial bearing surface 238B. The radial bearing surface 236A is configured to contact the inner surface 173A of cavity portion 173 of the torch body 110 (see FIG. 3B). The axial bearing surface 238A is configured to rest on the bearing surface 174A of the torch body 110 (see FIG. 3B). The radial bearing surface 238B is configured to contact the sidewall 174B of cavity portion 174.

The holding portion 240 includes a cylindrical portion 242 and a frustoconical portion 244. The holding portion 240 includes bond interface 222 between to the electrode 210 and electrode holder 220. An outer surface 242A of the cylindrical portion 242 may be configured to contact the sidewall 175A of cavity portion 175 (see FIG. 3B) to prevent radial movement of the electrode assembly 200 when received in the torch body 110. Meanwhile, an outer surface of the frustoconical portion 244 is configured to cooperate with the nozzle 140 to guide a laminar flow of the first shield gas to the electrode 210, as is described in further detail below.

An inner surface of the frustoconical portion 244 is configured to align with the outer surface of the distal end 212 of the electrode 210. That is, an angle θ2 between two opposite outer surfaces of the frustoconical portion 244 of the electrode holder 220 is substantially equal to angle θ1 of the distal end 212 of the electrode 210. Thus, in the embodiment shown, angle θ2 is about 18 degrees, +/−2 degrees. In other words, an angle between a longitudinal axis 201 of the electrode assembly 200 and an outer surface of the frustoconical portion 244 is about 9 degrees, +/−1 degree. However, again, in other embodiments, the distal end 212 may have a frustoconical shape of different dimensions, such as a frustoconical shape with an angle θ2 between two opposite outer surfaces in the range of about 10-60 degrees.

The electrode 210 material may be tungsten. The electrode holder 220 material may be copper. The electrode holder 220 may be back-casted directly to the tungsten electrode 210. For example, the tungsten electrode 210 may be disposed in a mold, or crucible, and molten copper may be added to the mold. The molten copper slowly cools from around the tungsten electrode 210 to the contact portion 224, such that a crystalline structure of the cooling copper aligns with a crystalline structure of the tungsten electrode. For example, the interface 222 between the tungsten of the electrode 210 and copper of the electrode holder 220 may be a metallic bond or Van der Waals bond. For example, at the interface 222 between the electrode 210 and electrode holder 220, copper atoms from the electrode holder 220 may be diffused into the tungsten of the electrode 220. Accordingly, the electrode holder 220 is chemically and/or molecularly bonded to the electrode 210 (e.g., atoms and/or electrons of the electrode holder 220 interact with atoms and/or electrons of the electrode 210 to form the bond). Thus, the electrode 210 and electrode holder 220 are integrated into a single electrode assembly 200.

The integrated electrode assembly 200 has no boundary layers that impede heat transfer between the electrode 210 and the cooling portion 230 of the electrode holder 220. For example, because the electrode 210 and electrode holder 220 are bonded at the molecular level during a weld process, heat can easily be transmitted through the electrode 210 across interface 222 to the cooling portion 230 of the electrode holder 220. Thus, the integrated electrode assembly 200 may have improved heat dissipation as compared to conventional TIG/GTAW electrodes mechanically coupled to electrode holder assemblies. Additionally, the lack of interstitial spaces between the electrode holder contact portion 224 and the electrode 210 reduces the generation of resistive heating in the assembly as compared to conventional tungsten electrodes mechanically coupled to electrode holders. The improved heat dissipation and/or the reduced heat generation allow the electrode 210 to have one-half to one-fifth the length of conventional tungsten electrodes. For example, the tungsten electrode 210 may have a length of 15 to 122 mm (0.59 to 4.8 in).

Figure 5B:
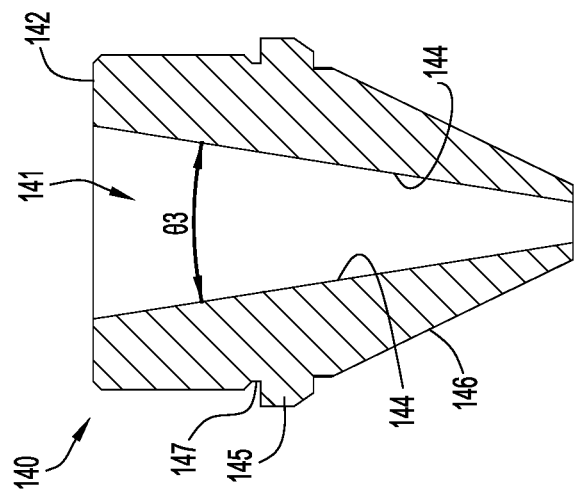
FIG. 5B is a cross-sectional view of the nozzle of FIG. 5A.
Figure 5A:
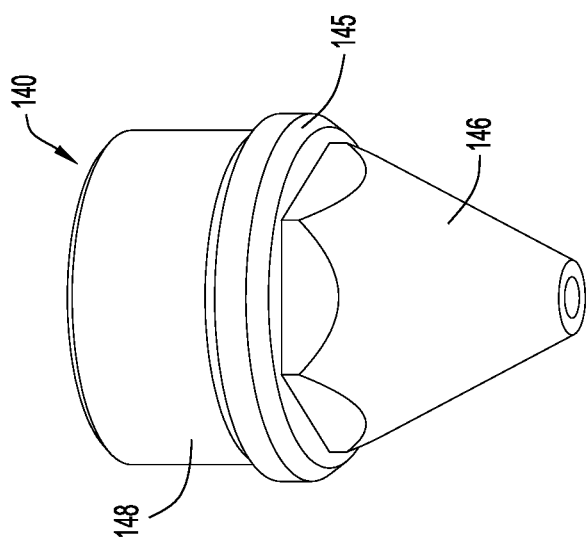
FIG. 5A is a perspective view of a nozzle according to an embodiment.

Referring to FIGS. 5A and 5B, a nozzle 140 is shown. The nozzle 140 includes a nozzle cavity 141, an upper surface 142, and an inner surface 144 defining the nozzle cavity 141. The nozzle cavity 141 is configured to receive and substantially mirror an outer surface of the electrode assembly 200. That is, the nozzle cavity 141 is formed by opposing inner surface 144 that form an angle θ3 therebetween. The angle θ3 may be about 18 degrees+−2 degrees so that it mirrors the angles θ1 and θ2 of the outer surfaces of the electrode 210 and electrode holder 220, respectively, and facilitates the formation of the high-speed, laminar flow 44 and constraint of the arc 410 noted above. Alternatively, the angle θ3 may have any dimension that mirrors (e.g., matches) the angles of the electrode 210 and electrode holder to form a passageway of a constant diameter. However, in still other embodiments, the angle θ3 may be dimensioned to form a passageway that converges or diverges towards the distal end of the electrode assembly, provided that the divergence or convergence facilitates the formation of the high-speed, laminar flow 44 and constraint of the arc 410 noted above.

The nozzle 140 further includes circumferential protrusion 145 radially extending from an outer surface 146. A circumferential groove 147, extending radially inward, is disposed adjacent to, but above, the circumferential protrusion 145. The circumferential protrusion 145 and groove 147 are configured to support an inner diameter of a rectifier 150 (see FIGS. 7A-9). The nozzle 140 further includes a threaded portion 148 for engaging corresponding threads at cavity portion 176 of the torch body 110.

To withstand the heat generated during the welding operation, the nozzle 140 may comprise a sintered copper-tungsten alloy. For example, the nozzle 140 may contain about 80 percent tungsten and about 20 percent copper. The sintering operation may comprise mixing a tungsten powder with a copper powder and providing the mixed powder into a mold. The mold is heated to melt the copper, and then cooled. Thus, a sintered copper-tungsten nozzle is formed with the tungsten and copper molecularly bonded together. The sintered copper-tungsten nozzle 140 can resist and dissipate received heat during the welding operation.

Referring to FIGS. 6A and 6B, a shield cap 130 is shown. The shield cap 130 includes cap cavity 131, a mounting portion 133 and a fluid guide portion 135. The cap cavity 131 is defined by an inner surface 132, a threaded surface 134 of the mounting portion 133, and an inner surface 138 of the fluid guide portion 135. The threaded surface 134 is configured to engage threads of the lower portion 119 of the torch body 110. For example, the shield cap 130 may be threaded onto the lower portion 119 of the torch body 110. The inner surface 138 of the fluid guide portion 135 is configured to guide the laminar flow 55 of the second shield gas 50. For example, the inner surface 138 may be angled. That is, an angle φ between opposing inner surfaces 138 may be selected to guide the laminar flow 55 of the second shield gas 50 to the work piece. For example, the angle may be 19 degrees+−3 degrees so that it mirrors a slope of the outer surface 146 of the nozzle 140 and facilitates the formation of laminar flow 55 of the second shield gas 50. Alternatively, the angle φ may have any dimension that mirrors (e.g., matches) the angles of the outer surface 146 of the nozzle 140 to form a passageway of a constant diameter. However, in still other embodiments, the angle θ3 may be dimensioned to form a passageway that converges or diverges towards the distal end of the electrode assembly, provided that the divergence or convergence that facilitates the formation of laminar flow 55 of the second shield gas 50.

The shield cap 130 further includes a rectifier seat 136 for supporting the rectifier 150. The rectifier seat 136 is disposed between the threaded surface 134 and the inner surface 138 of the fluid guide portion 135. The rectifier seat 136 extends radially into the cap cavity 131.

Figure 8:
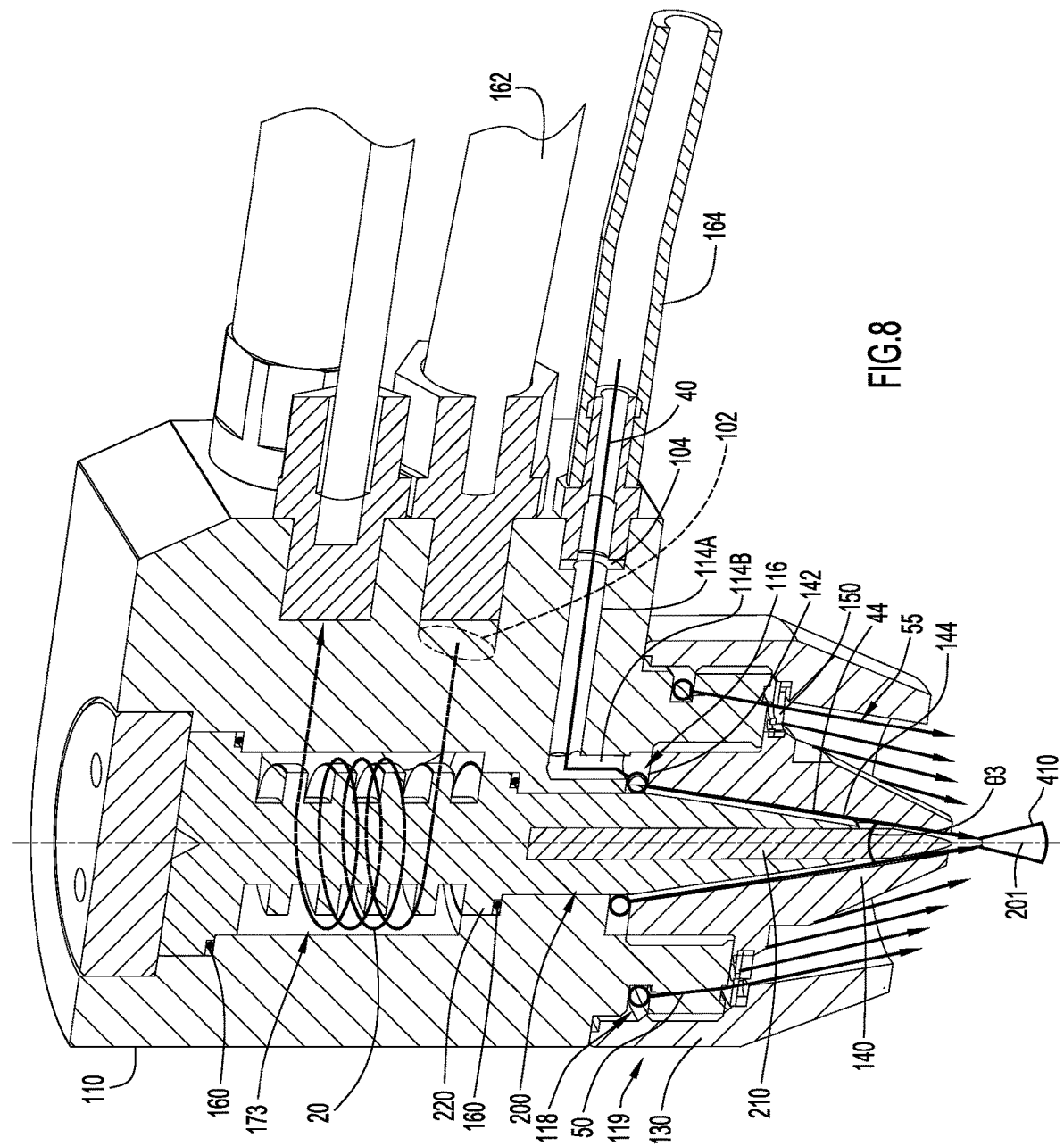
FIG. 8 is a cross-sectional view showing at least a first shield gas channel of the torch of FIG. 1.
Figure 9:
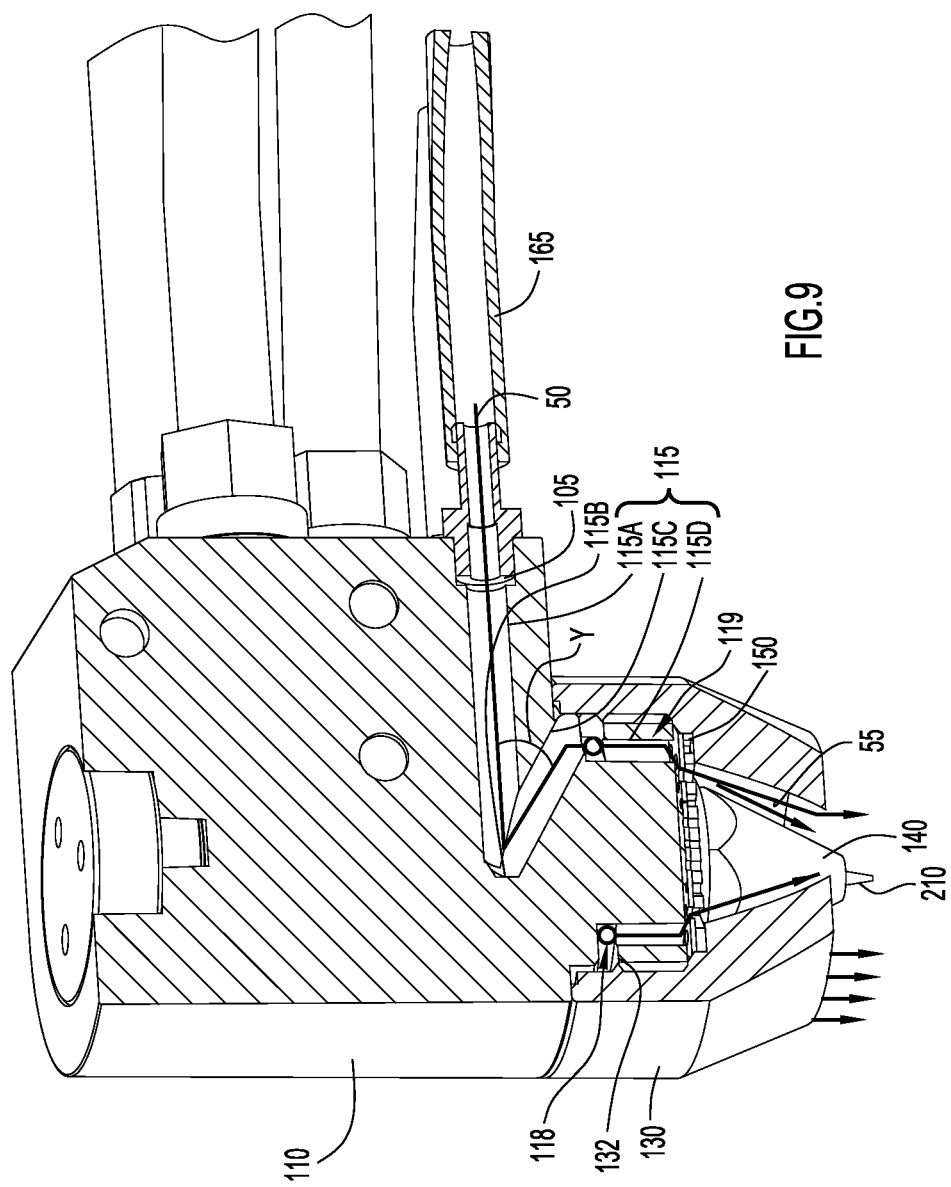
FIG. 9 is a cross-sectional view showing at least a second shield gas channel of the torch of FIG. 1.

When the shield cap 130 is attached to the lower portion 119 of the torch body 110, the inner surface 132 cooperates with the lower portion 119 to form a plenum 118 (see FIGS. 8 and 9). Additionally, the rectifier seat 136 and nozzle 140 cooperate to retain the rectifier 150. For example, an outer circumference of the rectifier 150 rests on the rectifier seat 136 of the shield cap 130 and an inner circumference of the rectifier 150 engages the protrusion 145 and groove 147 of the nozzle 140. In some embodiments, installing the shield cap 130 on the lower portion 119 of the torch body 110 may also secure the electrode assembly 200 and/or nozzle 140 to the torch body 110 (e.g., if the nozzle 140 does not include threads and/or the electrode assembly 200 does not include bearing surfaces and other such assembly features).

Figure 7A:
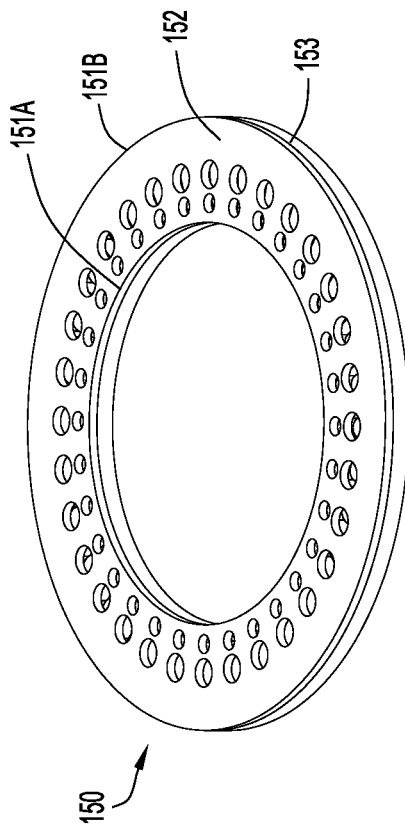
FIG. 7A is perspective view of a rectifier according to an embodiment.
Figure 7C:
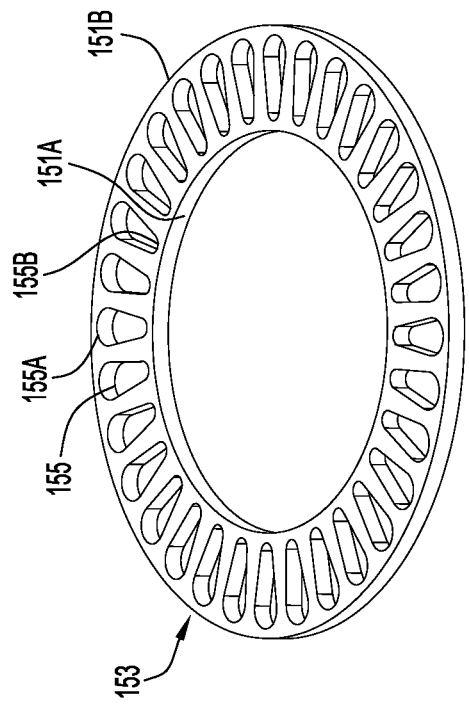
FIG. 7C is a perspective view of a second annular disc of the rectifier of FIG. 7A.
Figure 7B:
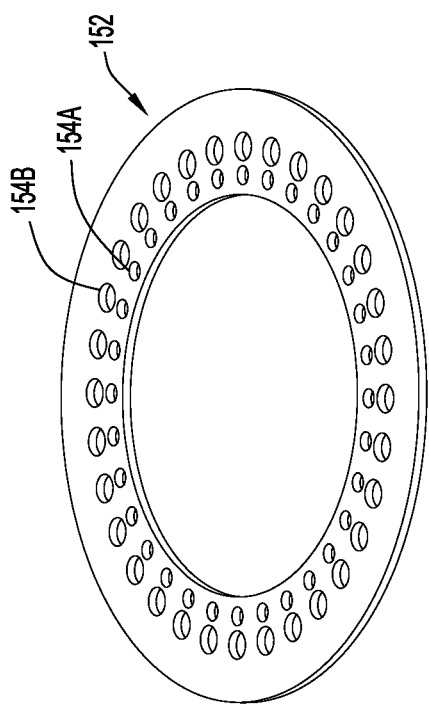
FIG. 7B is a perspective view of a first annular disc of the rectifier of FIG. 7A.

Referring to FIGS. 7A-7C, an annular rectifier 150 is shown having an inner circumference 151A and an outer circumference 151B. In this embodiment, the rectifier 150 comprises a first annular disc 152 stacked on a second annular disc 153.

The first annular disc 152 includes a first set through-holes 154A radially disposed about the inner circumference. A second set of through-holes 154B are disposed concentrically with the first set of through-holes 154A. For example, the first set of through-holes 154A are disposed at a first radius (measured from a center of the first annular disc 152) and the second set of through-holes 154B are disposed at a second radius (measured from a center of the first annular disc 152) greater than the first radius. The first and second set of through-holes 154A, 154B are disposed at a radially inner half to inner two-thirds of the first annular disc 152. Diameters of the second set of through-holes 154B are larger than diameters the first set through-holes 154A. In the depicted embodiment, each of the first set and second set of through-holes 154A, 154B are shown as having 32 holes, for a total of 64 through-holes. However, embodiments are not limited thereto.

The second annular disc 153 includes a plurality of oblong through-holes 155. The through-holes 155 include an outer sidewall 155A and a radially inner sidewall 155B. The outer and inner sidewalls 155A and 155B are curved. The radius of the curve of sidewall 155A is larger than a radius of a curve of sidewall 155B.

During operation, the second shield gas 50 flows through the through-holes 154A, 154B, 155 and into the shield cap cavity 131. Any circumferential velocity of the flow of second shield gas 50 is converted into axial flow through the through-holes 154A, 154B, 155. Thus, the through-holes 154A, 154B, 155 throttle the flow of the second shield gas 50. In some implementations, the first and second annular discs 152, 153 and through-holes 154A, 154B, 155 may be stamped from sheet metal. The first and second discs 152, 153 may have any number and configuration of through-holes to create a back pressure in the flow of first shield gas 40 and the laminar flow 44 exiting the rectifier 150.

Referring to FIGS. 8 and 9, the torch 100 and electrode assembly 200 are now shown with fluid flowing therethrough during a weld operation. During the welding operation, a weld current, cooling fluid 20, a first shield gas 40, and a second shield gas 50 are supplied to the torch 100 via supply lines 161-165. The current supplied to the torch 100 is transmitted to the electrode assembly 200 to create an arc 410 at the electrode distal end 212. The arc may be used to melt a work piece and/or filler material during welding. The current and arc 410 generate heat in the electrode assembly 200.

Cooling fluid 20 is supplied to the torch body 110 via cooling fluid supply line 162 to dissipate the heat generated in the electrode assembly 200 during a welding operation. The cooling fluid 20 flows through the cooling fluid supply port 102 to the cooling chamber 173 via cooling fluid supply channel 112 (shown in FIG. 3D). The cooling fluid 20 flows through the gaps 234 between the fins 232 of the electrode assembly 200. For example, the cooling fluid 20 may spiral around the cooling or central portion 230 of the electrode assembly 200. Heat generated during the welding operation is conducted, or transmitted, to the cooling fluid 20. Because the electrode 210 is molecularly bonded to the electrode holder 220, there are substantially no boundary layers to impede the flow of heat between the electrode 210 and the cooling portion 230 of the electrode holder 220. Accordingly, the cooling portion 230 can efficiently dissipate the heat from the electrode 210 to the cooling fluid 20. The cooling fluid 20, and the heat transferred to it, flows out of the cooling chamber 173 through cooling fluid return channel 113 and out of the torch body 110 through the cooling fluid return port 103 to cooling fluid return line 163. Accordingly, the heat generated during the weld operation is dissipated, transferred to the cooling fluid, and removed from the system via the cooling fluid return line 163. Thus, the electrode assembly 200 is efficiently cooled and the temperature of the distal end 212 of the electrode 210 may be maintained at a desired temperature, e.g., at, or below, about 1200 degrees Celsius, preferably about 1000 degrees Celsius.

Seals 160 are disposed between the electrode assembly 200 and the torch body 110. The seals prevent cooling fluid from leaking from cavity portion 173. For example, a seal 160 (e.g., an O-ring) may be disposed between the contact portion 224 of the electrode holder 220 and the bearing surface 172A of cavity portion 172 of the torch body 110. Another seal 160 (e.g., an O-ring) may be disposed between the third bearing member 238 of the electrode holder 220 and the bearing surface 174A of the torch body 110.

In some implementations, the cooling fluid 20 may be a gas or a liquid. For example, the cooling fluid may be air or water, however, embodiments are not limited thereto. The cooling fluid may be any fluid capable of removing a desired amount of heat from the cooling portion 230. Due to the efficient cooling of the electrode assembly 200, the overall length of the electrode 210 and electrode holder 220 may be shorter than conventional TIG/GTAW electrodes and holders. Additionally, the flow of cooling fluid may be supplied by conventional TIG/GTAW water pumps without the use of a chiller. That is, due the properties efficient cooling of the electrode assembly 200, unchilled liquid may be used as a cooling fluid 20.

Still referring to FIGS. 8 and 9, the first shield gas 40 flows into the torch body 110 from supply line 164 via port 104. Channel 114 guides a flow of first shield gas 40 from port 104 to a first plenum 116 disposed at the end of channel 114. The first plenum 116 comprises an annular cavity formed between the torch body 110 and an upper surface 142 of the nozzle 140. The first plenum 116 and channel 114 may create back pressure in the flow of first shield gas 40. From the first plenum 116, the first shield gas 40 flows between the electrode assembly 200 and inner surface 144 of the nozzle 140, enveloping the holding portion 240 and the electrode 210 of the electrode assembly 200 in a high-speed, laminar flow 44 of first shield gas 40. That is, high-speed, the laminar flow 44 of first shield gas 40 completely surrounds the holding portion 240 and the electrode 210 of the electrode assembly 200, preventing other gases from contacting the electrode 210. Put yet another way, the outer surface of the electrode assembly and the inner surface 144 of the nozzle form a radial gap and the first shield gas 40 flows from channel 114 into the radial gap to surround the electrode assembly 200 (the plenum 116 may also be an annular plenum formed in the radial gap).

The flow 44 is a high-speed, laminar flow because of the back pressure in the plenum 116, the close proximity of the electrode assembly 200 to the inner surface 144 of the nozzle 140, angle θ3 of opposing inner surfaces 144 of the nozzle 140 (see FIG. 5B), and/or the angles θ1, θ2, of the opposing outer surfaces of the holding portion 240 and the electrode 210 (see FIG. 4C). For example, a radial gap between an outer surface of the electrode assembly 200 and the inner surface 144 of the nozzle 140 may be about 0.25 mm to 6 mm (0.01 in to 0.25 in). In some implementations, the angles θ1, θ2, θ3, may be about 18 degrees+−2 degrees which may provide a steep chamber that encourage high-speed flow which assists in constraining the arc 410. The high-speed, laminar flow 44 of the first shield gas 40 provides a stable, radially constrained arc 410. That is, due to the high-speed, laminar flow 44 discharged at a steep angle by the nozzle 140, the arc 410 is focused at a desired distance from the distal end 212 of the electrode 210. For example, the sharp angles θ1, θ2, θ3 of the electrode assembly 200 and the nozzle 140 facilitate a high-speed, laminar flow 44 of the first shield gas 40 that constrains and focuses the arc 410 at the desired distance during a welding operation. The desired distance may be the desired arc length between the distal end 212 of the electrode and a work piece. Additionally, the high-speed, laminar flow 44 provides a gas-curtain, preventing other gases from contacting the electrode 210 and/or the arc 410.

Because the arc 410 is radially constrained by the high-speed, laminar flow 44, the desired arc length may be varied by a larger amount than conventional TIG/GTAW welding. For example, the desired arc length may range from 0.5 mm to 10 mm (0.02 in to 0.4 in). In some implementations, an arc length of 1.5 mm (0.059 in) is desirable. Accordingly, the arc 410 is less susceptible to fluctuations that can impact weld quality in response to changes in weld parameters, e.g., arc length, current, voltage, temperature, shield gas pressure, etc.

The first shield gas 40 may be an inert gas, or mixture of gases, e.g., argon, helium, nitrogen, oxygen, carbon dioxide, nitrogen dioxide, hydrogen, etc. The flow rate of the first shield gas 40 may be any desired flow rate to create a high-speed, laminar flow 44, e.g., without turbulence, between the inner surface 144 of the nozzle 140 and an outer surface of the electrode assembly 200. For example, the flow rate of the first shield gas 40 may be 1 to 25 liters per minute ("l/min") (0.035-0.882 cubic feet per minute ("cfm")). In some implementations the flow rate may be 3 l/min (0.106 cfm).

Still referring to FIGS. 8 and 9, the second shield gas 50 flows through the torch body 110 via channel portions 115A and 115B of the second shield gas channel 115 to a plenum 118. The plenum 118 is a cavity formed between the lower portion 119 of torch body 110 and an inner surface 132 of the shield cap 130. From the plenum 118, the second shield gas 50 flows through channels 115C radially disposed about the lower portion 119 of the torch body 110 to a rectifier 150. Channels 115C extend substantially parallel to axis 201. The rectifier is disposed between the shield cap 130 and nozzle 140. The rectifier 150 is configured to receive the flow of the second shield gas 50 from channels 115C and to diffuse and rectify a direction of the flow through the shield cap 130. For example, the flow of the second shield gas 50 may include circumferential flow when it exits channels 115C that is diffused and rectified by the rectifier 150 to flow through the shield cap 130.

The rectifier 150, plenum 118, and channels 115, 115C contribute to generating back pressure in the flow of the second shield gas 50, such that a laminar flow 55 of the second shield gas 50 is generated and maintained through cap cavity 131 of the shield cap 130. The laminar flow 55 of the second shield gas 50 passes through the shield cap 130. Put another way, the outer surface of the nozzle 140 and the inner surface of the shield cap 130 form a radial gap and the second shield gas 50 flows from channel 115 into the radial gap to surround the nozzle 140 (In some implementations, the plenum 118 and rectifier 150 may also be annular and formed in the radial gap). During a welding operation, the laminar flow 55 of the second shield gas contacts a workpiece. The electrode 210 is protected from the laminar flow 55 of the second shield gas 50 by the high-speed, laminar flow 44 of the first shield gas 40. That is, the high-speed, laminar flow 44 of the first shield gas 40 prevents the second shield gas 50 from contacting the electrode 210.

The second shield gas 50 may be an inert gas or mixture of inert gases. For example, the second shield gas may include argon and/or helium. In some implementations, the second shield gas 50 may further include one or more active gases. For example, active gases such as oxygen, nitrogen, hydrogen, and/or carbon dioxide may be added to the inert gas. For example, the second shield gas may be a gas mixture comprising about 0 to 10% nitrogen, about 0 to 5% carbon dioxide, about 0 to 3% oxygen, about 0 to 12% hydrogen, and the remainder comprising argon and/or helium when used with stainless steel or other alloys of steel. In some implementations, the gas mixture may be about 90.71% argon, about 4% nitrogen, about 5% hydrogen, and about 0.29% carbon dioxide. The addition of active gases to the second shield gas 50 may impact the quality of weld. For example, adding carbon dioxide improves weld penetration, e.g., how deep the weld pool travels into the work piece, by reducing the surface tension of the weld pool and reversing the Marangoni flow within the weld pool. As a further example, adding nitrogen to the second shield gas 50 may control the content of ferritic and/or austenitic stainless steel in a weld. Accordingly, thicker workpieces may be welded with improved weld quality and less heat as compared to conventional TIG/GTAW torches.

The flow rate of the second shield gas 50 may be any desired flow rate to create the laminar flow 55, e.g., without turbulence, between an outer surface 146 of the nozzle 140 and an inner surface 138 of the shield cap 130. For example, the flow rate of the second shield gas 50 may be 1-25 liters per minute ("l/min") (0.035-0.882 cubic feet per minute ("cfm")). In some implementations, the flow rate may be 12 l/min (0.4238 cfm). In some implementations, a ratio of the flow rate of the second shield gas to the flow rate of the first shield gas may be 4 to 1.

Adding active gases to conventional TIG/GTAW torches typically cause the tungsten electrode to prematurely wear and/or oxidize, reducing the useful life of the tungsten. Therefore, with a conventional torch, any efficiency gained in the welding operation by adding an active gas are lost due to frequent replacement of the electrode. However, since the first the flow of shield gas 40 acts as a gas-curtain around the electrode 210, the two flow system of the present embodiment avoids the premature wear and/or oxidization (e.g., that would otherwise be caused by active gas of shield gas 50) of the conventional torches while improving weld penetration and quality as compared to conventional TIG/GTAW welding.

Figure 10:
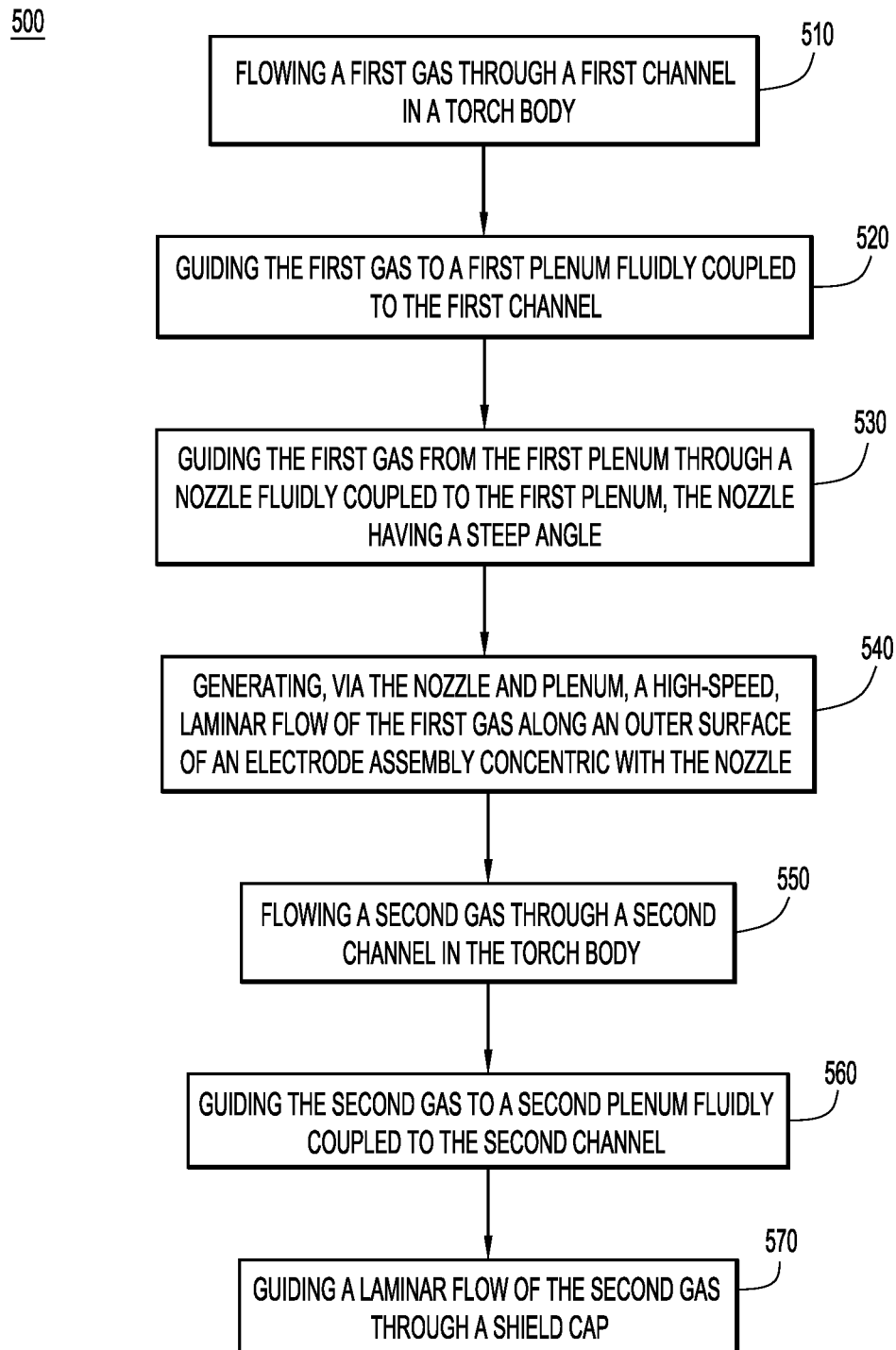
FIG. 10 is a method of operating a TIG/GTAW torch according to an example embodiment.

Referring to FIG. 10, a method 500 for operating a TIG/GTAW torch 100, according to an embodiment, is depicted. The method includes flowing a first gas through a first channel in a torch body in operation 510; guiding the first gas to a first plenum fluidly coupled to the first channel in operation 520; guiding the first gas from the first plenum through a nozzle fluidly coupled to the first plenum, the nozzle having a steep angle in operation 530; generating, via the nozzle and plenum, a high-speed, laminar flow of the first gas along an outer surface of an electrode assembly concentric with the nozzle in operation 540; flowing a second gas through a second channel in the torch body in operation 550; guiding the second gas to a second plenum fluidly coupled to the second channel in operation 560; and guiding a laminar flow of the second gas through a shield cap in operation 570. Notably, in operations 530 and 570, gas does not flow through a wall of a consumable part (e.g., the nozzle or shield cap), but flows through a cavity or opening defined by the consumable part, along an inner or outer surface of the respective consumable part.

The first gas is an inert gas, and the second gas is a mixture of an inert gas and one or more active gases. During a weld operation, the high-speed, laminar flow of the first gas prevents the second gas from contacting the electrode assembly. Thus, oxidation of the electrode is avoided.

The laminar flow of the second gas is generated, in part, by a back pressure that is built up in the torch body by the configuration of the second channel. As noted above and shown in FIGS. 3C and 9, the second channel 115 has a V-shape. The V-shape of the channel helps generate the back pressure in the second shield gas. A rectifier, disposed between the nozzle and shield cap, also increases the back pressure of the second gas and rectifies and diffuses the flow of the second gas before flowing through the shield cap and onto a workpiece.

In some implementations, the second gas may be an inert gas or mixture of inert gases e.g., argon and/or helium. In some implementations, one or more active gases (e.g., carbon dioxide, oxygen, hydrogen, nitrogen, etc.) may be added to the second gas. The active gases may impact the quality of the weld. As noted above, adding carbon dioxide to the second gas reduces the surface tension of the weld pool and reverses the Marangoni flow of the molten metal in the weld pool, providing greater weld penetration at lower temperatures as compared to TIG/GTAW welding with only inert gases. As a further example, adding nitrogen to the second gas controls the content of ferritic and/or austenitic stainless steel in a weld.

Referring to FIGS. 11A-11C, a conventional TIG/GTAW torch 300 is compared to torch 100. In FIG. 11A, an arc 410 between the electrode 210, according to an embodiment, and a work piece 400 is shown with an arc length of about 6 mm. Due to the high-speed, laminar flow 44 of the first shield gas 40, an angle α between the outer edges of the arc 410 is relatively small even at the long arc length of 6 mm. For example, the angle α may be about 30 degrees. In FIG. 11B, a conventional TIG/GTAW torch 300 is shown. The conventional torch 300 includes a shield cap 310 and electrode 320. During operation, an arc 420 between a conventional electrode 320 and a work piece 400 with an arc length of about 3 mm is shown. Though the arc length is half the length of the arc 410, the angle β between the outer edges of the arc 420 is much larger. For example, the angle β may be about 60 degrees, almost double the size of arc 410. Referring to FIG. 11C, a comparison between the arc 410 from electrode 210 and arc 420 from a conventional electrode 320 separated by cutaway line 401. The constrained arc 410 from torch 100 according to the example embodiment provides better weld performance as compared to conventional torches 300. Additionally, the conventional TIG/GTAW torch generates more heat resulting in an electrode having a higher temperature along the distal end. The two-gas torch 100 provides a constrained arc 410 that produces less heat while providing greater flexibility in useable arc lengths and improved weld penetration as compared to conventional TIG/GTAW torches 300.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Moreover, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:
1. A torch body for welding comprising:
a cavity configured to receive and support an electrode assembly;
a cooling fluid supply channel extending from the cavity to an external surface of the torch body so that the cooling fluid supply channel is configured to direct a cooling fluid into the cavity and into contact with the electrode assembly;

a cooling fluid return channel extending from the cavity to the external surface of the torch body so that the cooling fluid return channel is configured to direct the cooling fluid out of the cavity;

a first shield gas channel extending from the cavity to the external surface of the torch body so that the first shield gas channel is configured to direct a first shield gas into the cavity; and a second shield gas channel configured to direct a second shield gas along a second shield gas path that is radially exterior of the cavity.

2. The torch body of claim 1, wherein the cooling fluid return channel is disposed axially above the cooling fluid supply channel so that the cooling fluid flows away from an operative end of the torch body when flowing through the cavity from the cooling fluid supply channel to the cooling fluid return channel.

3. The torch body of claim 1, wherein the cavity includes a cavity portion disposed between the cooling fluid return channel and the cooling fluid supply channel, the cavity portion being configured to cooperate with a portion of the electrode assembly to create a swirling flow between the cooling fluid return channel and the cooling fluid supply channel.

4. The torch body of claim 3, further comprising an additional cavity portion disposed between the cavity portion and an operating end of the electrode assembly, the additional cavity portion being configured to radially secure the electrode assembly in the cavity.

5. The torch body of claim 1, wherein the cavity defines a first seat and a second seat that is axially spaced from the first seat, the first seat and the second seat providing two points of contact at which to axially support the electrode assembly.

6. The torch body of claim 5, wherein the first seat includes or is configured to receive a first seal and the second seat includes or is configured to receive a second seal, the first seal and the second seal axially bounding and sealing a cavity portion within which the cooling fluid flows.

7. The torch body of claim 1, further comprising an electrical port configured to receive a power supply line that conducts electricity to the torch body, the torch body being configured to conduct the electricity to the electrode assembly.

8. The torch body of claim 1, wherein the first shield gas channel is fluidly connected to a first plenum defined, at least in part, by the cavity, the first plenum being disposed on a radially exterior surface of an electrode holder of the electrode assembly.

9. The torch body of claim 1, wherein the second shield gas channel comprises:
a horizontal channel extending from a side of the external surface of the torch body; and
a transverse channel extending from a distal end of the horizontal channel toward the side of the external surface of the torch body, wherein an angle between the horizontal channel and the transverse channel is acute.

10. The torch body of claim 1, wherein the electrode assembly comprises an electrode and an electrode holder molecularly bonded to the electrode.

11. A torch body for welding comprising:
a cavity configured to receive and support an electrode assembly;
a first shield gas channel extending from an external surface of the torch body to a first plenum that is fluidly coupled to the cavity so that the first shield gas channel is configured to direct a first shield gas into the cavity, wherein the first plenum is defined, at least in part, by the cavity and is disposed radially exterior of a portion of the electrode assembly; and
a second shield gas channel configured to direct a second shield gas to exit the torch body along a path that is radially exterior of the cavity, wherein the second shield gas channel comprises:
a horizontal channel extending from a side of the external surface of the torch body; and
a transverse channel extending from a distal end of the horizontal channel toward the side of the external surface of the torch body, wherein an angle between the horizontal channel and the transverse channel is acute.

12. The torch body of claim 11, wherein the first plenum is disposed radially exterior of an electrode holder of the electrode assembly.

13. The torch body of claim 11, wherein the torch body is further configured to support a nozzle in a position that is concentric with the electrode assembly, and the first plenum being fluidly connected to a radial gap defined between an electrode of the electrode assembly and the nozzle.

14. The torch body of claim 13, wherein the first plenum, the nozzle, the radial gap, and the electrode assembly are configured to create back pressure that generates a laminar flow of the first shield gas through the radial gap.

15. The torch body of claim 11, wherein the angle between the horizontal channel and the transverse channel is acute between 15 degrees and 45 degrees.

16. The torch body of claim 11, wherein the transverse channel terminates at a second plenum defined, at least in part, by the external surface of the torch body, the second plenum being fluidly coupled to a second shield gas path that is concentric with an additional portion of the electrode assembly.

17. The torch body of claim 16, wherein:
the torch body is configured to support a nozzle concentric with the electrode assembly and a shield cap concentric with the electrode assembly;
the second shield gas path is defined between the nozzle and the shield cap; and
a rectifier is disposed between the shield cap and the nozzle and configured to rectify a flow of the second shield gas flowing from the second plenum into a laminar flow.

18. A system for welding comprising:
an electrode assembly including an electrode;
a nozzle configured to be concentric with the electrode assembly; and
a torch body including:
a cavity configured to receive and support the electrode assembly;
a first shield gas channel extending from the cavity, through a plenum formed between offset surfaces of the nozzle and the torch body, and to an external surface of the torch body so that the first shield gas channel is configured to direct a first shield gas along an exterior surface of the electrode and create a first shield flow around the exterior surface of the electrode; and
a second shield gas channel configured to direct a second shield gas along a second shield gas path that is radially exterior of the first shield flow.

19. The system of claim 18, further comprising:
a shield cap configured to be concentric with the electrode assembly, wherein the second shield gas path extends between the nozzle and the shield cap.

20. The torch body of claim 1, wherein the cooling fluid return channel is configured to direct the cooling fluid from the electrode assembly out of the cavity.

\* \* \* \* \*